April 10, 1962 R. W. COOK 3,029,101
CONVERTIBLE RACK FOR TRUCKS
Filed Aug. 2, 1960 2 Sheets-Sheet 1
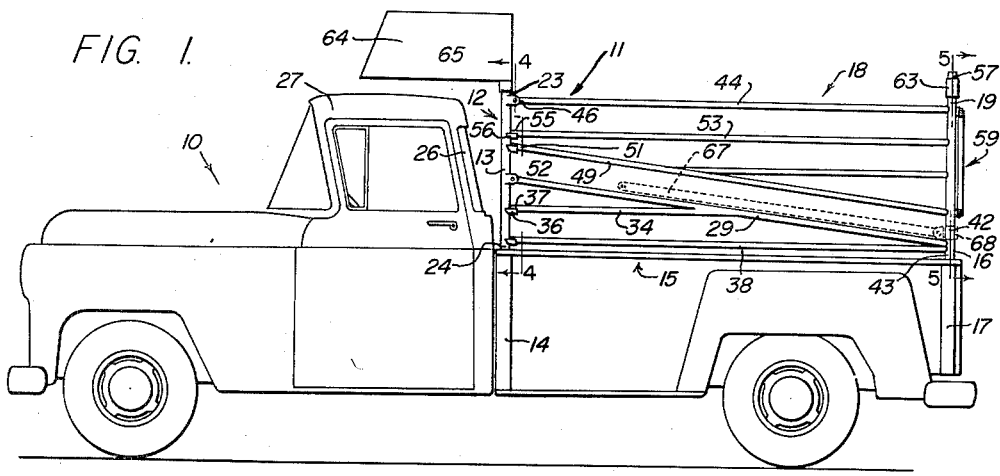
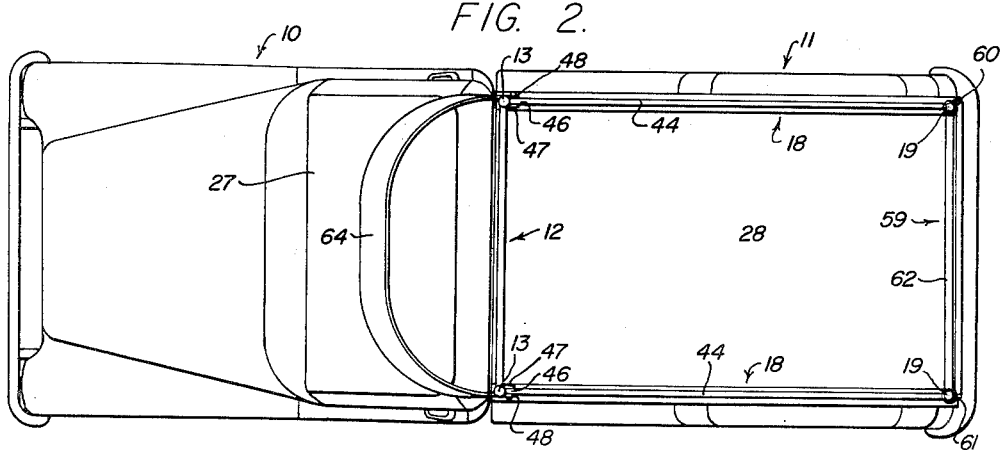
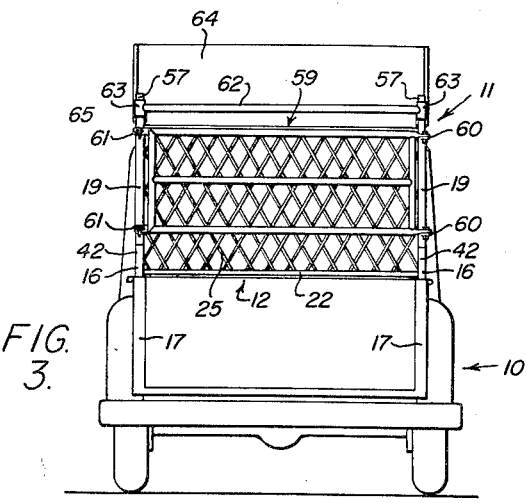
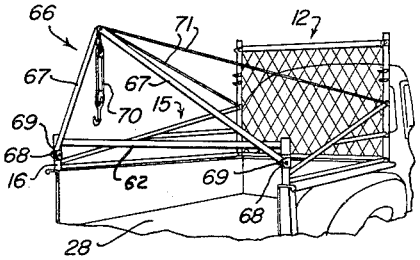
INVENTOR.
ROY W. COOK
BY
ATTORNEYS

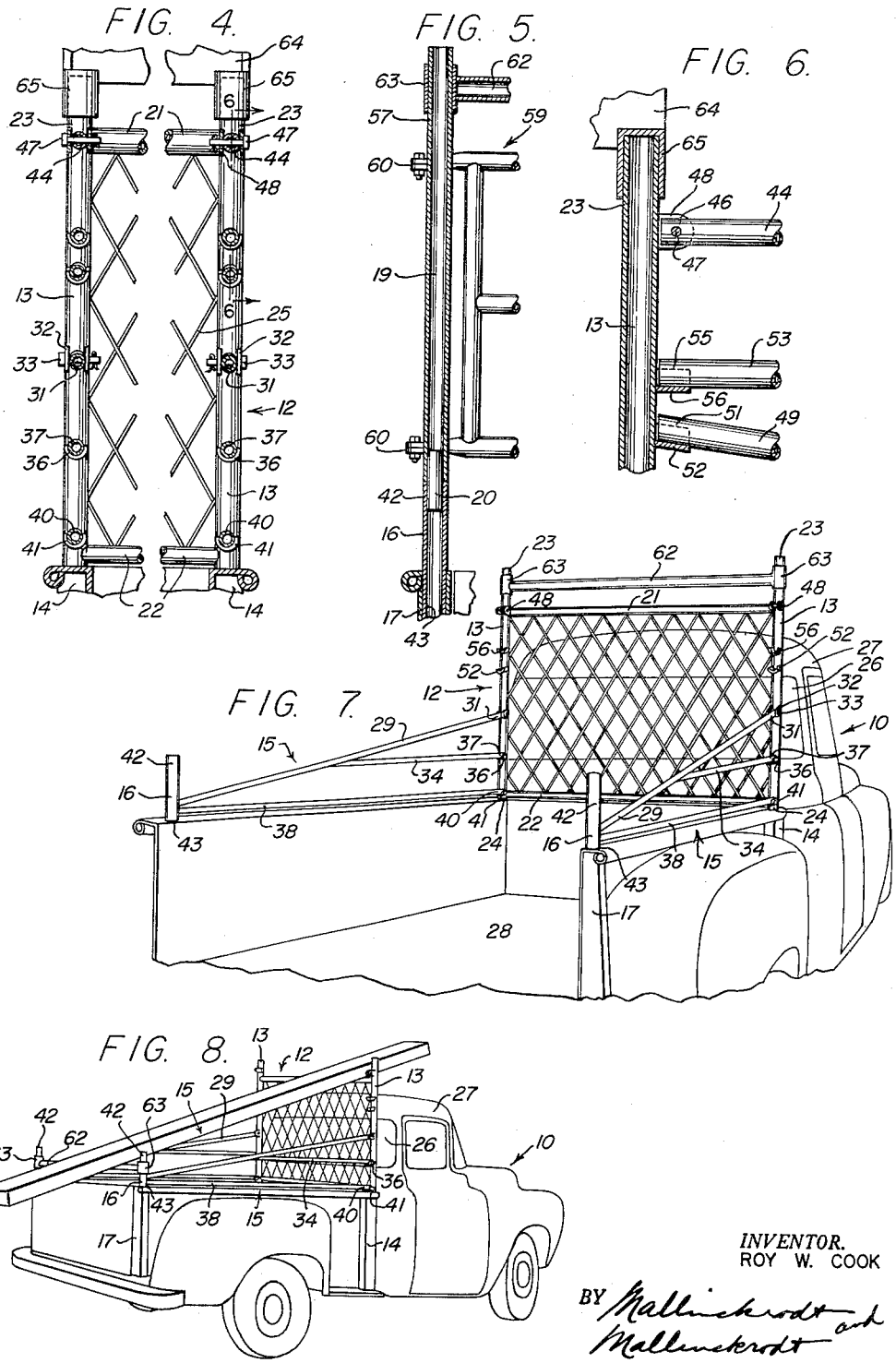

United States Patent Office 3,029,101
Patented Apr. 10, 1962

3,029,101
CONVERTIBLE RACK FOR TRUCKS
Roy W. Cook, Woodside, Utah
Filed Aug. 2, 1960, Ser. No. 47,065
9 Claims. (Cl. 296—12)

This invention relates to racks for trucks, and is particularly concerned with providing such a rack which can be quickly and conveniently converted to diverse useful forms.

Small trucks of the pickup type are called upon to perform various tasks, particularly when used on the farm or ranch and for occasional city trips. Such all-around farm and ranch use requires many different rack arrangements. Racks have generally been designed for a particular truck use and have had to be changed frequently to satisfy the requirements of other truck uses. For example, a truck is often used for hauling livestock, such as horses, cattle, or sheep. This calls for a full height rack. While such a full height rack is also handy for hauling long ladders, pipe, and relatively light poles, which bridge and can be supported by forward and rearward rack sections, it cannot be satisfactorily used for supporting relatively heavy poles and like loads weighing, say, over 800 pounds. Moreover, such a full height rack precludes other uses contemplated by the present invention, notably the mounting of a winch.

It is, therefore, a principal object of this invention to provide a rack for trucks, which rack is quickly and easily convertible from one useful form to another.

In achieving this, I provide rack sections which are of composite, separable character, respectively, the several parts of each being selectively usable, singly or together, in combination with single or integrated parts of the other rack sections.

A specific embodiment representing what is presently regarded as the best mode of carrying out the invention is illustrated in the accompanying drawings.

In the drawings:

FIG. 1 represents a side elevation of a pickup truck equipped with a completely assembled, convertible rack conforming to the invention;

FIG. 2, a top plan;

FIG. 3, a rear elevation;

FIG. 4, a fragmentary vertical section taken on the line 4—4 of FIG. 1;

FIG. 5, a similar view taken on the line 5—5 of FIG. 1;

FIG. 6, another similar view taken on the line 6—6 of FIG. 4;

FIG. 7, a fragmentary perspective view of the truck with the rack partially disassembled to essentially half-rack condition for ordinary truck use;

FIG. 8, a perspective view of the truck and rack in the condition shown in FIG. 7 but with head bar transferred to tail gate position for the carrying of exceptionally heavy long loads; and FIG. 9, a fragmentary perspective view showing a winch mounted on the half-rack of FIG. 7.

Referring to the drawings:

The pickup truck 10 is equipped with a convertible rack 11 which is uniquely useful for all-around farm or ranch use and occasional city trips. Such usefulness is afforded by reason, principally, of the fact that this rack 11 is quickly and easily convertible into a half-rack and into various half-rack arrangements.

For the purpose of such convertibility, rack 11 is made up of several separate sections, each of which is conveniently and advantageously fabricated from lengths of standard size pipe welded together. A forward rack section 12 has two vertical stakes 13, which, as here shown, are mounted in the forward stake pockets 14 of pickup truck 10. Two lower, side rack sections 15 have tubular, stub, stake members 16 at their rear ends, respectively, for insertion in rear stake pockets 17 of the truck and for receiving and securing various additional rack sections. Two upper, side rack sections 18 have tubular stake members 19 at their rear ends, respectively. These are conveniently adapted, by means of center pins 20, for mounting as upward extensions of the respective stub stake members 16.

The two vertical stakes 13 of forward rack section 12 are conveniently joined together by cross frame members 21 and 22 in such a manner that each stake 13 has an extension 23 above and an extension 24 below the respective cross frame members. A screen 25 or other grating structure is advantageously provided between the two vertical stakes 13 and between cross frame members 21 and 22 to protect the rear window 26 of truck cab 27 from livestock being carried. Lower extensions 24 of stakes 13 are conveniently held by forward stake pockets 14 when rack section 12 is mounted at the forward end of the truck bed 28.

Referring particularly to FIGS. 1 and 7, each lower, side rack section 15 is provided with a frame member 29, which extends forwardly and upwardly from rigid connection with tubular stub stake member 16. Referring also to FIG. 4, the forward end 31 of such frame member 29 is separably fastened to a flange 32 of the corresponding stake 13 as by means of a pivot pin 33. A frame member 34 extends forwardly from rigid connection with frame member 29, intermediate the ends thereof. Each stake 13 is advantageously provided with a socket 36 for holding the forward end 37 of the frame member 34 of the corresponding side rack section 15. A frame member 38 extends forwardly from rigid connection with the stub stake member 16 of each rack section 15.

In each rack section 15, frame member 29 is above frame member 38, and these members extend forwardly from stub stake member 16 in divergent relation, since frame member 29 is angled upwardly. The forward end 40 of each frame member 38 is conveniently held by a socket 41 provided on the corresponding stake 13 in the same manner as described above for the forward ends 37 of frame members 34, which are held in sockets 36.

The tubular stub stake member 16 of each lower, side rack section 15 has an upper extension 42 above the connection of frame member 29 with the stub stake member, and is additionally provided with a lower portion 43 extending below the connection of frame member 38. Such lower portion 43 is received and held in the appropriate rear stake pocket 17.

With this construction, each lower, side rack section 15 is advantageously held in place by one pin 33. As long as pins 33 are in place, the respective stub stake members 16 will bind in their rear stake pockets 17 to prevent any force from raising such lower, side rack sections 15. However, when the pin 33 for a section 15 is removed, the section may be easily lifted up and away as long as a rack section 18 is not in place thereabove.

These upper, side rack sections 18, which are assembled above rack sections 15, respectively, to provide a full height rack 11, have many features in common with such rack sections 15. Referring to FIG. 6, each rack section 18 is provided with an upper frame member 44, which extends forwardly from rigid connection with a stake member 19 to a forward end 46 adapted for pivotal connection, by a pin 47, with a flange 48 of the appropriate stake 13. A lower frame member 49 extends forwardly and upwardly from rigid connection with the appropriate stake member 19 to a forward end 51, which is held by a socket 52 provided on the stake 13. Each of the rack sections 18 also has a frame member 53 extending forwardly from rigid connection with stake member 19. The forward end 55 of such frame member 53 is conveniently held by a socket 56 provided on stake 13.

The tubular stake members 19 each have an upper extension 57 above the connection of frame member 44 therewith for a purpose to be made clear. The center pins 20 project from the lower ends of such stake members 19, within which they are secured as by means of pressed fits, and are received within tubular stub stake members 16, respectively, as shown in FIG. 5.

With this construction, each upper rack section 18 is advantageously held in place by one pin 47, which may be a duplicate of the pins 33 used with the lower rack sections 15. As long as pins 47 are in place, the center pins 20 will bind within stub stake members 16 to resist any force tending to lift upper rack sections 18. However, when the pins 47 are removed, such rack sections 18 may be easily lifted up and removed to convert the rack 11 to a half rack.

A rear gate 59, which is conveniently mounted on a stake member 19 by hinge means 60 and is adapted for being fastened to the other stake member 19 by hasp means 61, is provided for use with the full rack 11.

A head bar 62 is also provided, being adapted by tubular end members 63 for mounting either on extensions 23 of stakes 13, on extensions 57 of stake members 19, or on extensions 42 of stub stake members 16. These various head bar mountings aid in adapting rack 11 for various uses, such as for hauling long ladders, pipe, and relatively light poles, which bridge and can be supported by the forward rack section and the head bar 62 in the full rack assembly shown in FIGS. 1, 2, 3 and 5, and for supporting relatively heavy poles and like loads weighing, say, over 800 pounds, when the full rack has been converted to a half rack, as shown in FIG. 8. Moreover, it is also possible to carry a small boat, in lieu of using a boat trailer, by lashing it securely in place on the half rack assembly.

A wind-screen 64, adapted by tubular end members 65 for mounting on extensions 23 of stakes 13 in the same manner as head bar 62 is mounted thereon, may be easily installed to provide protection from wind for livestock, particularly horses, standing on the bed of the truck.

The rack 11 is also useful as means for mounting a light duty winch 66 as shown in FIG. 9. Winch 66 includes two gin poles 67 each of which is adapted by a tubular end member 68 for mounting on the extension 42 of a stub stake member 16. The gin poles 67, which are pivotally connected to their end members 68 by hinge means 69, are conveniently held together at their outer ends by a winch pulley structure 70 of conventional design. Cables 71 extend from the outer ends of gin poles 67, and are connected to forward rack section 12 to provide the length necessary to support winch 66 in the particular attitude desired for any given work to be performed.

Head bar 62 may be advantageously used to structurally brace stub stake members 16 when the gin poles 67 are mounted thereon. It should also be realized that winch 66 may be conveniently used with both the half rack and with the full rack assemblies. Between periods of use with the full rack 11, gin poles 67 may be disconnected at their outer ends and swung to nest between the lower and upper rack sections 15 and 18, respectively, at the opposite sides of the rack, as shown by dotted lines in FIG. 1, where they may be securely lashed in place.

Whereas there is here illustrated and described a preferred construction which I presently regard as the best mode of carrying out my invention, it should be understood that various changes may be made without departing from the disclosed inventive subject matter particularly pointed out and distinctly claimed herebelow.

I claim:

1. A convertible rack for pickup trucks equipped with a cab and a load-carrying bed having forward and rearward stake pockets, comprising a forward rack section which includes two vertical stakes of approximately cab height having lower stub portions adapted for mounting in the forward stake pockets, respectively, and having upper stub portions adapted to receive separable superstructure, and which further includes transverse frame members rigidly joining said stakes above said lower stub portions; two lower side rack sections, each having a relatively short rear stake member which includes a lower portion adapted for mounting in a rear stake pocket and an upper portion adapted to receive and retain a mounting member of an additional rack section, each of said side rack sections further having frame members extending forwardly and sloping upwardly from rigid securement to said rear stake member above said lower portion thereof to respective terminations at the corresponding stake member of said forward rack section; and means carried by said stakes of the forward rack section for separably connecting the forward ends of said frame members of said side rack sections, respectively, to said forward rack section.

2. The convertible rack of claim 1, including two poles adapted for use as part of a winch mounted on the rear of the truck, each of said two poles being provided with a sleeve at one adapted for mounting on the rear stake members of the lower side rack sections.

3. The convertible rack of claim 1, wherein the separable superstructure is a transversely extending head bar, having mounting members at its ends adapted for engagement with the upper stub portions of the vertical stakes of the forward rack section.

4. The convertible rack of claim 3, wherein the additional rack section is a transversely extending head bar, having mounting members at its ends adapted for engagement with the upper portions of the rear stake members of the lower side rack sections, respectively.

5. The convertible rack of claim 1, wherein the connecting means comprise upwardly open socket members rigidly secured to and projecting rearwardly from the stakes of the forward rack section, for receiving the forward ends of the frame members of the side rack sections; and removable fasteners for securing at least one set of the frame members in their receiving socket members.

6. The convertible rack of claim 1, wherein there are two additional rack sections in the form of upper side rack sections, each having a rear stake member adapted for mounting on the rear stake of one of the lower side rack sections as an upward extension thereof and having frame members extending forwardly from said rear stake member to respective terminations at the corresponding stake member of the forward rack section; and means carried by the stakes of the forward rack section for separably connecting the forward ends of said frame members of said upper side rack sections, respectively, to said forward rack section.

7. The convertible rack of claim 6, wherein the connecting means comprise upwardly open socket members rigidly secured to and projecting rearwardly from the stakes of the forward rack section, for receiving the forward ends of the frame members of the side rack sections; and removable fasteners for securing at least one set of the frame members in their receiving socket members.

8. The convertible rack of claim 6, wherein the separable superstructure is a wind-screen, having rearward means for mounting it on the upper stub portions of the vertical stakes of the forward rack section so that it extends forwardly over the truck cab to protect livestock standing on the bed of the truck.

9. The convertible rack of claim 6, wherein there are additionally provided a rear gate; hinge means for pivotally mounting said gate on one of the rear stake members of an upper side rack section; and latch means for securing said gate to the rear stake member of the other upper side rack section.

References Cited in the file of this patent
UNITED STATES PATENTS

| | | |
|---|---|---|
| 1,690,372 | Livesay | Nov. 6, 1928 |
| 2,661,106 | Morgan | Dec. 1, 1953 |
| 2,720,414 | Hart | Oct. 11, 1955 |
| 2,808,291 | Van Meter | Oct. 1, 1957 |